United States Patent [19]

Ahmed

[11] 4,339,633

[45] Jul. 13, 1982

[54] MODULAR TELECOMMUNICATIONS SYSTEM

[75] Inventor: Fahim Ahmed, Guelph, Canada

[73] Assignee: International Standard Electric Corporation, New York, N.Y.

[21] Appl. No.: 194,209

[22] Filed: Oct. 6, 1980

[51] Int. Cl.³ .............................................. H04Q 5/18
[52] U.S. Cl. ........................... 179/99 M; 179/18 AD; 370/85
[58] Field of Search .............. 179/99 M, 18 FA, 18 J, 179/18 AD, 18 B, 18 ES; 370/67, 85

[56] References Cited

U.S. PATENT DOCUMENTS

| | | | |
|---|---|---|---|
| 3,856,993 | 12/1974 | Closs et al. | 370/85 |
| 3,935,396 | 1/1976 | Barselotti | 179/99 M |
| 3,993,873 | 11/1976 | Bogda et al. | 179/18 AD |
| 4,112,261 | 9/1978 | Shiff | 179/99 M |
| 4,155,115 | 5/1979 | Wilske | 370/85 |

*Primary Examiner*—Gerald L. Brigance

*Attorney, Agent, or Firm*—James B. Raden; Marvin M. Chaban

[57] ABSTRACT

A telecommunications system for both PABX and key systems use.

The system is assembled in modules capable of physical and electrical interconnection and expansion. The system has a control apparatus housed in one modular sectional unit. The stations of the system are grouped with the control for each group being housed within a sectional unit. The units are adapted for physical mounting to one another and each unit is electrically connected into the system by two flat conductor cables jumpered to the adjacent unit. This modularity is made possible by each unit having internal bus structure for the bidirectional flow of information in the module, the intermodular connection acting as the bus between groups and the central control. Further, each group has a data memory for storing information directed into or out of modular unit on a random basis for reading out that information when the destination module is ready to receive that information.

4 Claims, 8 Drawing Figures

MODULAR TELECOMMUNICATIONS SYSTEM

BACKGROUND OF THE INVENTION

Distributed processing systems in the telecommunications art are well known, and their number is rapidly proliferating. One type is shown in U.S. Pat. No. 4,127,742 issued Nov. 28, 1978 to G. Couturier, et al.

In that system, intercommunication between a group control and the system control is effected over a number of busses, a time division speech bus, various scanner control conductors, and other control conductors.

Also well known in the art are telecommunications systems for interconnecting multiple lines at multiple line telephone instruments over time-divided conductors, there being two speech conductors common to all lines having access to the instrument and two or more control conductors coupled to each instrument. Where the transmission of control data is bidirectional, only two control conductors are required, as shown by U.S. Pat. No. 3,935,396 issued to J. Barselotti, et al. on Jan. 27, 1976. Unidirectional transmission of data requiring four conductors—two for transmitting and two for receiving—is known by many U.S. patents, such as U.S. Pat. No. 3,475,256 issued July 1973 to R. L. Carbrey.

SUMMARY OF THE INVENTION

The present invention is directed to a telecommunications system capable of key system usage and capable of usage as a PABX. The system employs time division transmission of control data between stations (terminals) of the system. Each station or trunk of the system has a pair of control conductors and a pair of speech conductors extending from the station or trunk to the group control. Information on the control conductors is time multiplexed for control of calls to and from the stations. Data on the speech pair may be fed in analog form from the station to a codec at the group for conversion into a suitable time division code. Alternatively coders can be placed in the station instrument for digital transmission throughout the system.

The system as disclosed herein uses two-level hierarchy comprised of a central control as one level and plural group control as the other level. In the system, each group control is housed in a separate module or unit. The system uses a central control which is also housed in a module. Interconnection between the group controls and the central control is by two multiple conductor cables extending between a terminal block in one module to the adjacent module, one for data and one for coded speech. A power and test cable are also connected to complete the system. Thus, to expand the system within its intended capacity, one or more added group modules are mounted on the structure and interconnect cables added for connection of each module to the adjacent module.

In order to enable one data bus to interconnect a module to the adjacent module, each module must be fully self-contained for internal data control. The self-containment is produced by having internal busses extending from the processor of a module to the memory and other intra-modular components. One such internal bus is called the nucleus bus in that it interconnects the module processor with its program memory and its own resources components. The nucleus bus is kept to a short physical length to minimize the possibility of noise and accidental shorts on the bus. Such busses are provided internally within the system control module and within each group module.

Further adding to the efficiency of the internal and external bus approach is the polling or mail box RAM approach shown by my earlier patent application Ser. No. 135,464 filed Mar. 31, 1980. In that disclosure, data transmitted from the system to a group module was temporarily stored until the group processor was prepared to handle that data. Similarly, on transmission of data from the group to the system, the data was temporarily stored within the group until the system evidenced its ability to handle the receipt of the data. By this expedient of the temporary memory to hold data to or from the system bus, the use of the system bus can be controlled to the point that the present inter-modular connection becomes possible.

It is therefore an object of the invention to provide a fully modular telecommunications system in which all systems control data is transmitted on one multiple conductor bus, used to provide control data transfer. All speech and voice frequency data is spent on a second multiple conductor bus from a module to the adjacent module and/or connection of the modules into the system.

It is a further object of the invention to provide a telecommunications system in which there are a plurality of units, each equipped with its own microprocessor, and in which the intercommunication of each processor with its memory is effected over a bus individual to that processor and internal to the module of the processor whereby to enable each processor to communicate with the remainder of the system over a common bus. In this manner, any problems occurring in one unit can be localized without affecting the operation of the entire system.

Other objects, features and advantages of the invention will be apparent from the following detailed description viewed in conjunction with the drawings which are described briefly hereafter.

BRIEF DESCRIPTION OF THE DRAWINGS

FIG. 2 is a block diagram showing how

DETAILED DESCRIPTION

Figure 1:
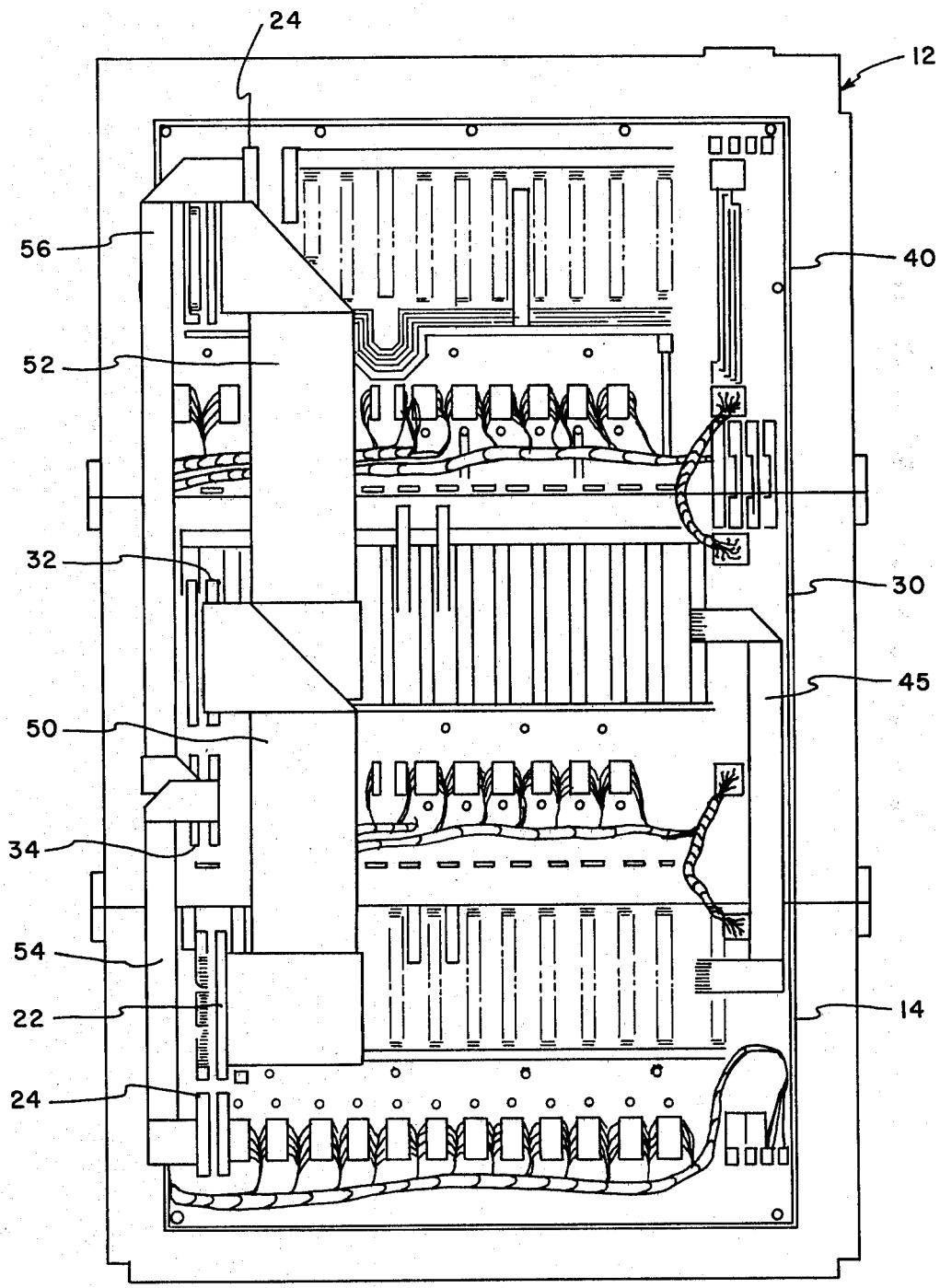
FIG. 1 is a front view in elevation of modular cabinet housing the system, the cabinet with its cover door removed, the cabinet employing the present invention.

In FIG. 1 is shown the physical structure of a system; the system as shown is comprised of three modular, vertically stacked units to provide two groups, each having 24-port capability.

The cabinet 12 of FIG. 1 has as the lowermost unit 14, the system control comprised of a plurality of printed circuit boards 16 inserted in the card cage of the unit in standard fashion. The circuits which make up the PC boards will be discussed later herein relative to FIG. 4. Connections are made from edge connections (not shown) or the like within the card cage to terminal blocks 22, vertically disposed along the side of the unit. A pair of elongated terminal blocks 22 provide 24 control connections, sixteen address and eight data, while a set of smaller blocks 24 (adjacent blocks 22) provide the speech or PCM connections on thirteen terminals. The PCM terminals include eight data, three clock and two signalling terminal connections.

Stacked physically above the bottom system control unit 14 is one group unit 30. This unit is comprised of a plurality of parallel PC boards insertd into the card cage to produce the group functions shown in the circuit of FIG. 3. The connections from the PC boards are jumpered between paired terminal blocks 32 for the control functions. The two blocks have a direct jumpered connection between like terminals so that connections from the unit can be made to the system unit and to the next adjacent group unit. A second pair of terminal blocks 34 is provided with its contacts jumpered to provide PCM speech data transfer between adjacent units.

A third unit 40 is stacked on the group unit 30. This group unit 40 is virtually identical to the group unit 30 and has terminal blocks for its own connection to the system and to an adjacent unit when an added group unit (not shown) is needed and stacked on the then existing cabinet structure.

To interconnect the units, two flat conductor cables are employed. A first cable 50 acts as the system bus interconnecting the system unit 14 with the adjacent group unit 30. The continuation of the system bus through cable 52 couples group unit 30 to group unit 40.

The second flat conductor cable 54 provides the PCM speech bus from system unit 14 to group unit 30. The continuation of this bus is formed by cable 56 between the two group units.

By mounting added group units on the existing structure and extending two flat conductor cables to the adjacent group, a system of up to one hundred and fourty-four ports may be formed by the present configurations, some of the ports being directed to stations of the system and others to trunks to a central office or the like.

Additionally, a test bus 45 is connected in daisy chain fashion from the system unit to the group units and a power supply cable is joined to the units. All interconnection between units (other than power and test) is effected over the daisy chained busses, system control bus and PCM line.

Figure 2B:
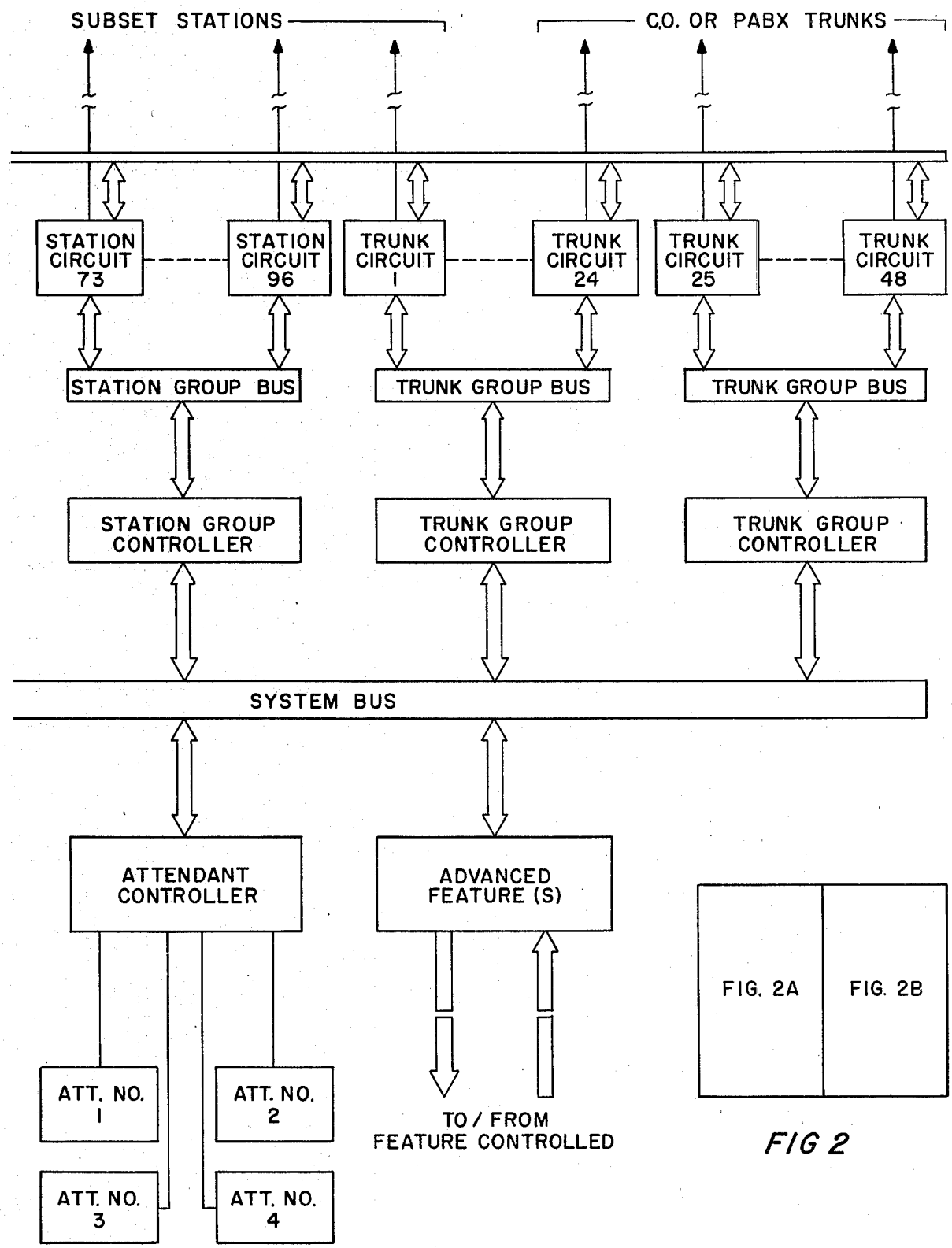
FIGS. 2A and 2B are positioned to form a schematic diagram of the invention in block form.
Figure 2A:
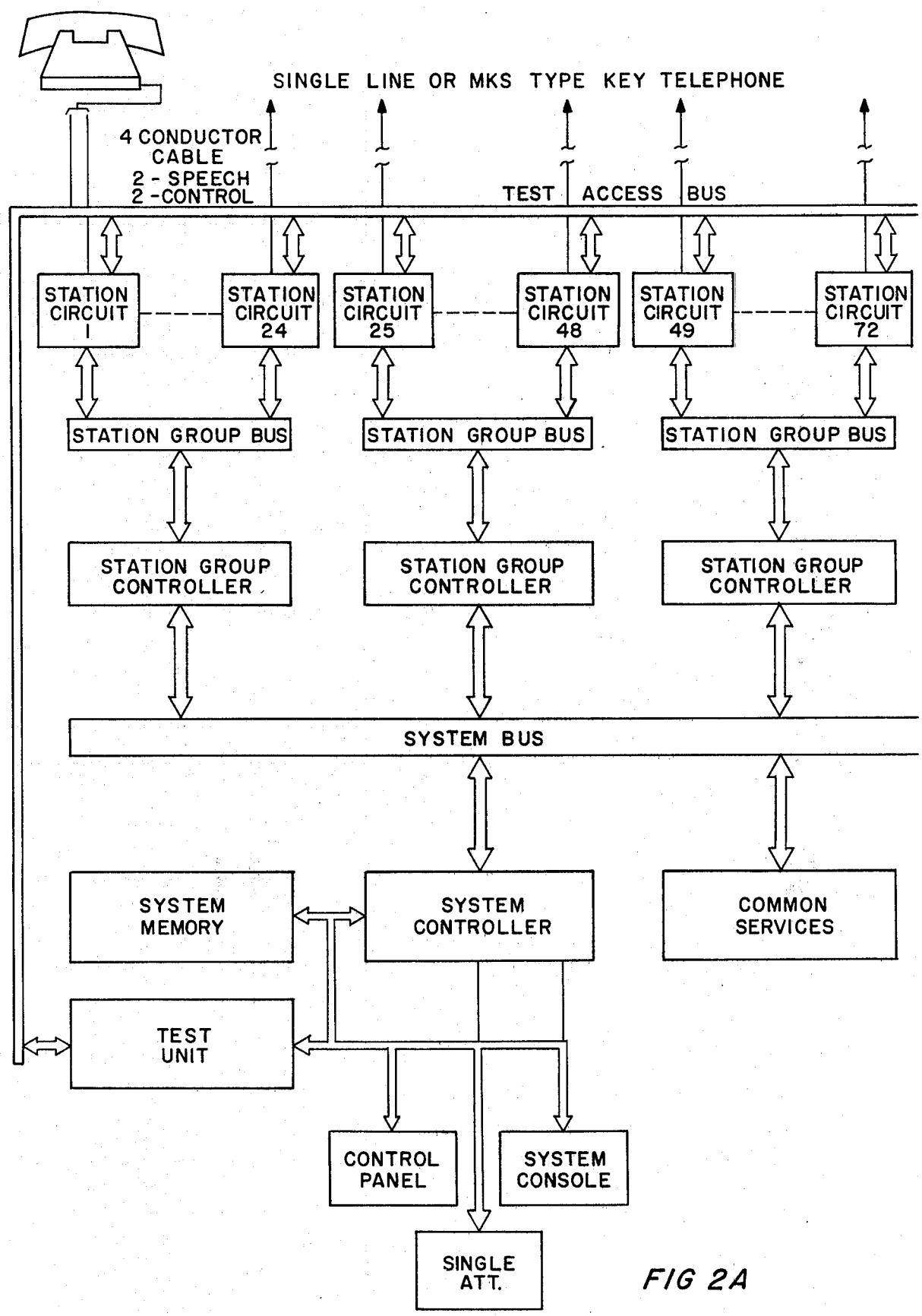

The system control architecture is based on a multi-microprocessor concept, arranged in a two-level hierarchy, seen best in FIG. 2.

A central system controller including a processor directs the operation of the second level of processors within the respective group controllers, which in turn each control a portion of the total system hardware.

The central system processor within the system controller communicates with the second level processors via a high speed parallel data bus called the System Bus (Cables 50, 52 of FIG. 1).

Each processor (both at the system and group level) has at its disposal its own memory and input/output resources.

The resources of the System Controller processor include the System Memory and System Administrative I/O channels such as Control Panel and System Console. Communication between the System Controller and its own resources is via a dedicated bus called the Nucleus Bus, internal to the processor module.

Each group or second level processor is required to share a portion of its resources with the System Controller. This shared resources is the means by which the System Controller processor directs the operation of the second level processors.

The System Controller processor has responsibility for overall system management, in terms of voice switch control and path selection, allocation of pooled system resources such a digit registers, tones, etc., data base management, call processing, feature invocation, administrative processing, system diagnostics, initialization and error recovery.

The group or second level processors are delegated tasks which are more hardware dependent, such as the direct control of station or trunk circuits, digit collection, conference network control, multi-attendant control, etc. Each group controller communicates with the circuits which it controls over an internal bus called the group bus. The station or trunk circuits in turn communicate with the station or trunk over respective four-conductor cables, as described in the previously cited Barsellotti, et al patent.

Every group comprised of up to 24 station and/or trunk circuits is driven by its own second level processor within a Group Controller.

The Group Controllers for groups comprised of stations communicate with keyphone subsets of the respective stations by transmitting lamp and tone caller status and receiving keyboard and hookswitch status data to and from each subset in turn. The Group Controller validates the received data, identifies a service request and informs the System Controller only if the request is genuine. It also monitors the hookswitch data for hookswitch flash, group recall, etc., and controls the ring and test access relays.

When a Group Controller acts as a Controller for a trunk group, it monitors and controls a group of up to 24 trunks of different types; e.g., loop start, ground start, etc.

The other second level processors perform similar dedicated hardware oriented tasks. On command from the system processor, the group processor acting as a dial pulse register will simultaneously monitor up to four channels for digit collection. A conference processor will look after the setting up of a conference once the conference configuration is provided to it by the System Controller.

Functions performed by the Group Controller include those which require the manipulation of relatively large amounts of data, guite frequently by the System Controller. For example, when an event is detected at one station, such as the selection of a line which appears at every station in the system, the System Controller will be required to update the status of the corresponding lamp at each station. This updating involves the searching of assignment tables in the system's data base and updating each lamp that matches the stored data in the table. When the total number of stations are multiplied by the number of lamps at each station, the need for a fast communication path becomes apparent. The disclosed method of communication is implemented by using the mailbox memory approach described by my co-pending application, as noted previously.

Using the mailbox technique, each Group Controller processor shares its data memory with the system processor. The System Controller is able to take over any Group Controller's RAM, treating it as its own, and is thus able to alter larger areas at the full speed of which it is capable.

A further type of function performed by the Group Controller is one which needs small amounts of data transfer, one example of which is a register function of the processor. When the System Controller is used for digit collection, it transmits to the involved group processor the PCM signalling time slot number, and the number of digits to monitor. This two or three byte exchange of information is sufficient for the group processor to start and continue its job quite independently for several seconds, at the end of which it will inform the system processor of the digits collected, if the interdigit timeout has expired or the dialing station has terminated the call.

For these types of functions a byte exchange handshaking protocol is optimum, due to its reduced hardware requirement.

The voice switch of the system is preferably a fully non-blocking 192 one-way time slot TDM switch adopted for 8 bit companded PCM or similar suitable code.

Figure 3:
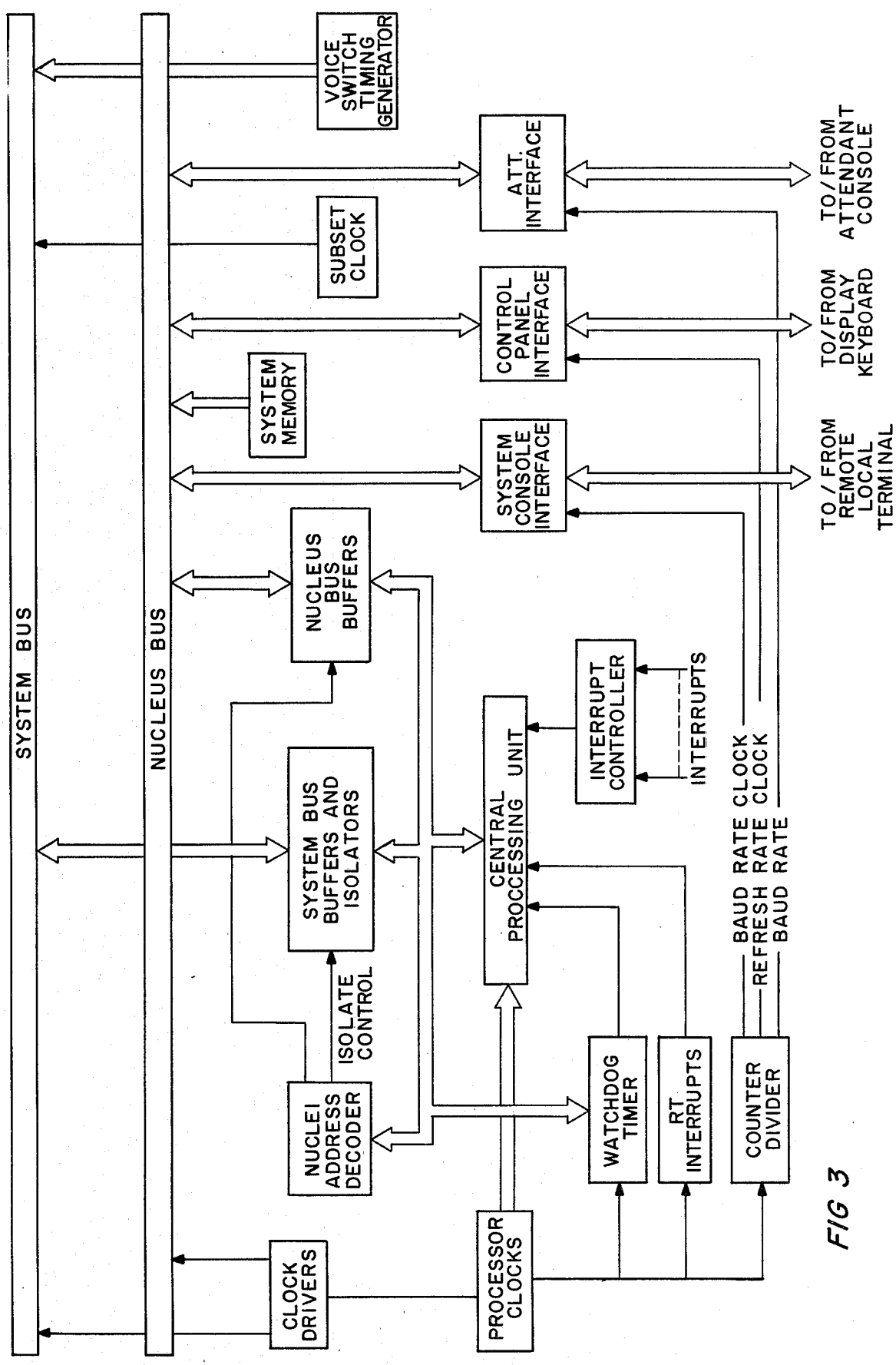
FIG. 3 is a schematic block diagram of a typical system controller as seen in FIG. 2.

In FIG. 3 is shown the components of the System Controller having access to the Nucleus Bus and to the System Bus. Also shown is a System Central Processing Unit (CPU) with its Interrupt Controller and clock inputs.

Addresses for data fed from the CPU are transmitted to the Nuclei Address Decoder to determine whether the address is that of the Nucleus Bus or that of the System Bus, due to the presence or absence of a suitable prefix.

The Nucleus Bus is physically a bus of short length, being on the order of twelve inches or less in length, and located totally within the system control unit. The nucleus bus provides communications between the CPU via Nucleus Bus Buffers to the System Memory, the System Console Interface, the Control Panel Interface and the Attendant Interfaces. This bus constitutes sixteen parallel conductors extending from the CPU buffers.

The System CPU also accesses the System Bus for interchanging information with the groups. The System Bus constitutes the multiple conductor flat cable (50, 52 in FIG. 1) extending from the Systems Controller in daisy chain fashion to the group control units, an exemplary group controller being shown in FIG. 4.

Figure 4:
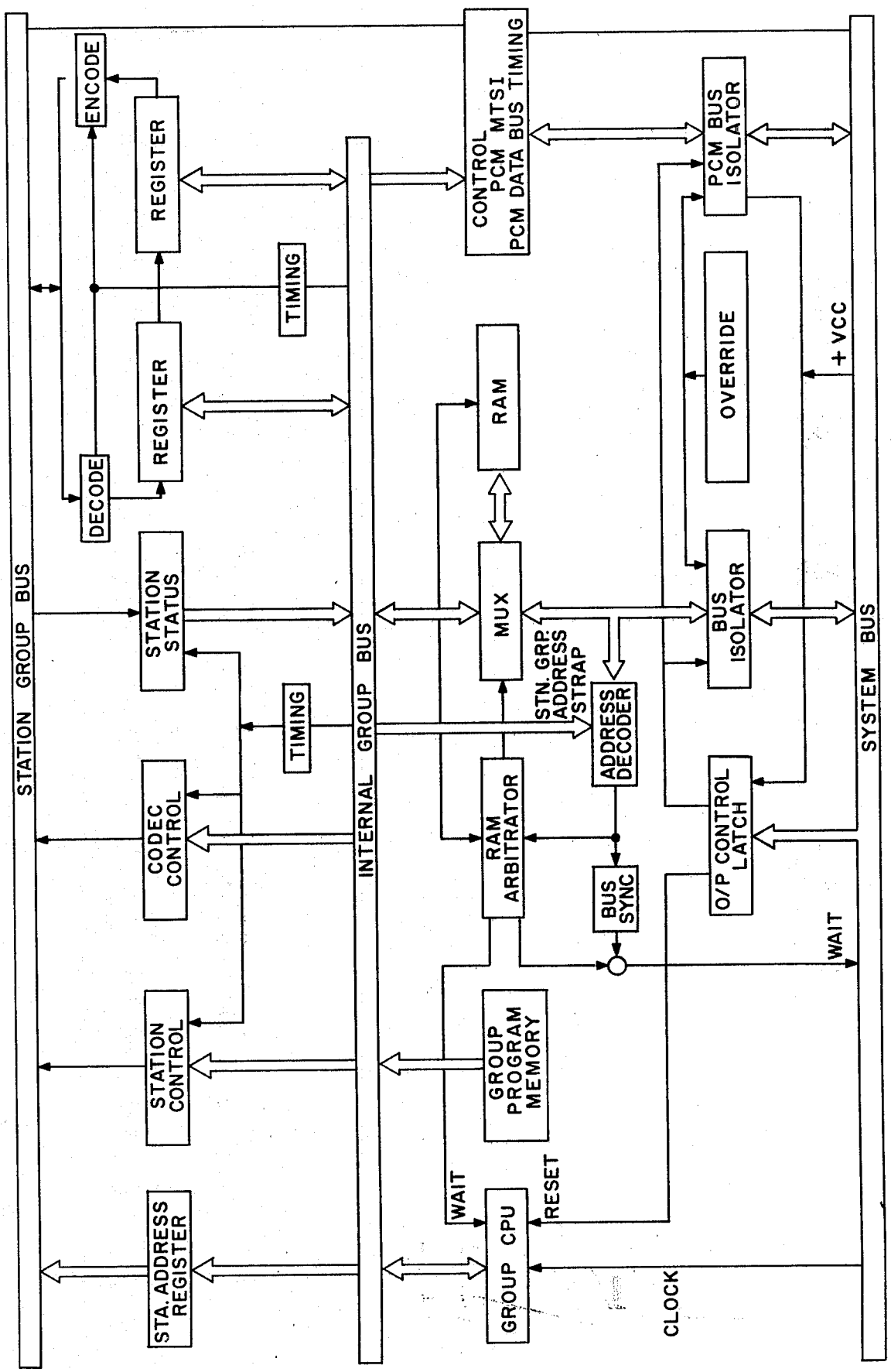
FIG. 4 is a schematic block diagram of the group controller as used herein.

The purpose of the Group Controller as shown in FIG. 4, is to relieve the System Controller of real-time functions associated with station or trunk (port) interfaces. A Group Controller, such as shown in FIG. 4 is mounted on a single printed circuit assembly to perform all the control functions associated with 24 port interfaces, and operates to communicate with the remainder of the system via the System Bus. A brief description of the blocks of FIG. 4 is as follows:

The Group controller contains as its CPU a dedicated 8085A single chip 8-bit N-channel microprocessor. The software required to perform the group control function is contained in the program memory of the controller. The allocated memory space for the program may be 4K bytes.

The Mail Box RAM is a static memory which acts to maintain the status of the port interfaces. The RAM is also shared by the System Controller. The allocated memory space is 4K bytes. The RAM Arbitrator decides whether the Internal Group Bus or the System Bus will have access to the mail box RAM. The access is on a first come-first served basis. If a request for RAM access is made from either the group or systems processor while the previous request has not been serviced, the RAM arbitrator will generate a wait flag to the requested CPU.

A multiplexer MUX is provided to select the data, address and Read/Write signal of the Group Bus or the System Bus for the mail box RAM.

The Address Decoder block contains address decoding logic to select one of the available Group Controllers.

The Bus Sync block includes the logic circuitory required to generate a wait cycle to the system CPU.

The block labeled PCM MTSI is a time slot interchanger which maintains the digital information relating to the TX/RX PCM time slots of codecs on the line interfaces under the control of the CPU.

O/P Control Latch is used by the system CPU to reset the Group Controller and to isolate the data latches from the System Bus. This latch function becomes important under system initialization, diagnostic and maintenance conditions.

The Bus Isolator block contains the logic circuitory required to isolate the 9-bits of bidirectional PCM data from the System Bus. It is controlled by the O/P control latch and the local power fail logic to perform its isolation function.

The Power Up/Down Control CCT & Manual Override circuit acts to disable the Bus isolators during a Group Controller power fail condition or when the manual override switch is activated during maintenance.

The PCM Bus Isolator contains the logic circuitry required to isolate the PCM bidirectional data bus from the System Bus. It is controlled by the system power rail of +VCC, O/P Control latch and the local power fail logic.

The Station/Trunk Address Register is an octal latch required to select one of Twenty-four line interfaces.

Station/Trunk Control is an 8-bit parallel to serial shift registers required for station/trunk control functions; i.e., line card identity or an alarm condition. The register is clocked at a frequency of 1.54 MHz.

The Codec Control is an 8-bit parallel to serial shift register required to direct the codecs on the line cards to transmit and receive PCM data on the time slot specified.

The Station/Trunk status circuit is a serial to parallel 8-bit shift register with tri-state outputs. It is used to monitor the line card information such as hookswitch condition, ground recall detection or ring detection.

The MSB Register is a bidirection 8-bit parallel to serial and serial to parallel shift register for the most significant bits of a data word. The Group Controller CPU loads an 8-bit word relating to the status of LEDS on a keyphone via the line interface card. The same register is used to receive the information regarding the On Hook/Off Hook status and the key depression status of the keyphones.

The LSB Register is a bidirectional 8-bit parallel to serial and serial to parallel shift register for the least significant bits. The Group Controller CPU loads an 8-bit word relating to the group address of the multibutton keyphone via the line interface card. The same is used to receive the complement of the data received by the MSB register.

The Encode logic circuitry performs diphase encoding on the data being sent to the keyphones via the line interface cards.

The Decode circuit decodes the diphase data received from the keyphones via the line interface cards.

The Timing block provides (1) the timing functions needed for station/trunk control, codec control and the station/trunk status blocks. Also, this timing element generates a 'wait' flag to the CPU if interrupted during the middle of sending/receiving information; and (2) the timing function needed to transmit/receive the diphase data from the keyphone. p1 With the circuit shown in FIG. 4, the group controller monitors the condition of its stations and/or trunks signal these conditions to the system controller. Data directed to the system controller it temporarily stored in the group RAM for polling by the system. In the reverse direction, data from the system bus is forwarded to the destination group RAM for subsequent read out when the group processor is ready to handle the data.

Figure 5:
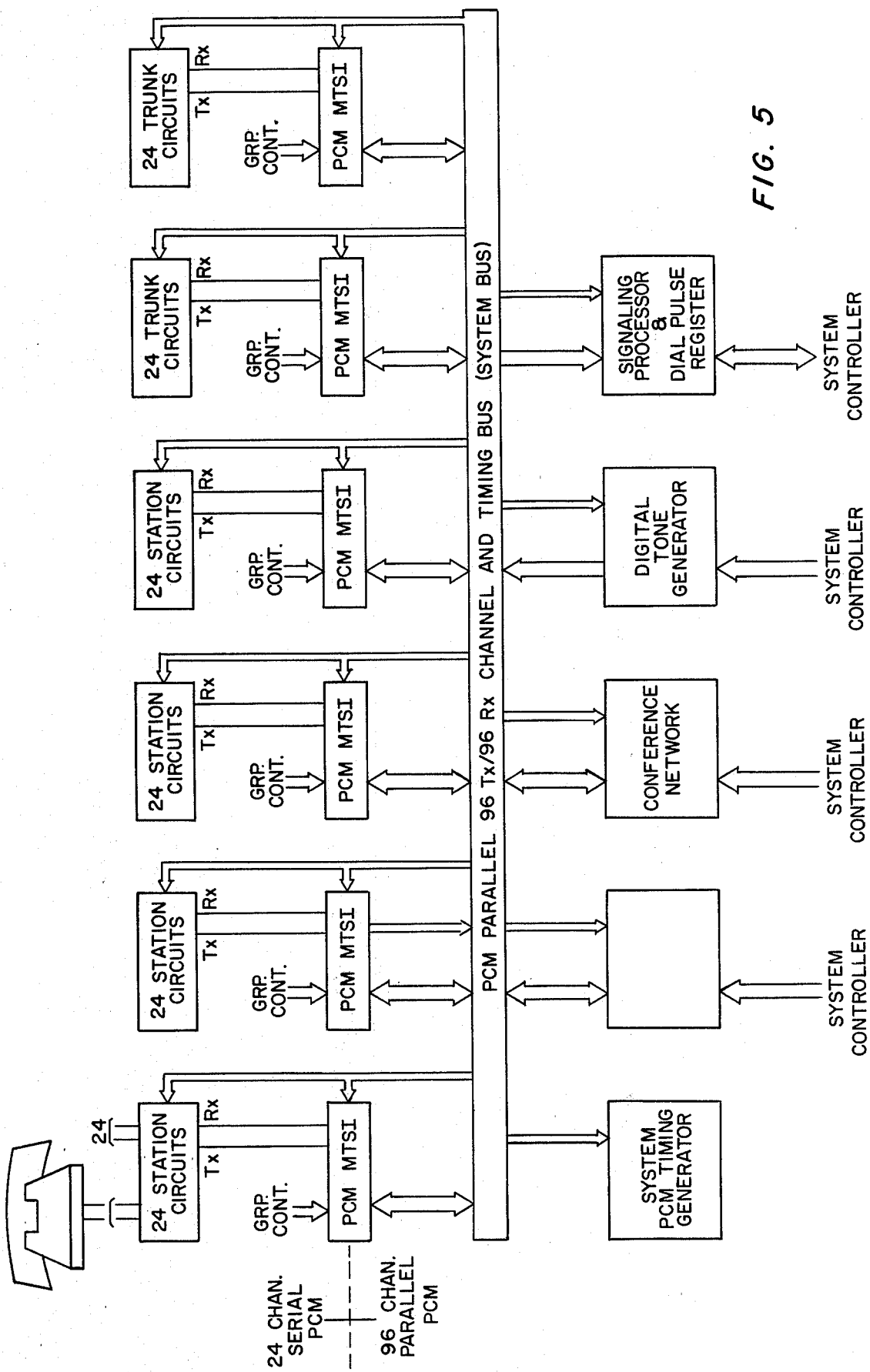
FIG. 5 is a schematic block diagram of the PCM speech network.

FIG. 5 shows a block diagram of the System Voice Switch, or speech path network. The voice switch is based on a Codec per line philosphy and is a fully digital PCM (pulse code modulation) A or μlaw, TDM (time division multiplex) 2-stage switch.

An analog voice signal is encoded on the station interface into an 8-bit companded PCM byte. The codec outputs this byte serially during one of 24 time slots in a 125 μs (8 KHz) frame.

The 24 outputs within each station group Module are subsquentially collected in a bit serial, byte serial format by a Group MTSI circuit, located on the Group Controller card. A 9th bit for signaling is also collected.

The Group MTSI is under control of the Group Controller processor and may be instructed under program control to output any one of the collected 24 bytes onto the System PCM Bus during one of 192 time slots in a 125 μs (8 KHz) frame.

The MTSI output is in bit parallel, byte serial format. In the opposite direction, the process is reversed by instructing the Group MTSI to input a 9-bit word during one of the 24 group time slots. In this direction the MTSI input is a bit parallel, byte serial format and output is a bit serial, byte serial format.

Minimal CPU time overhead is imposed by making the MTSI operation independent of the CPU. Once instructed it continues to perform the above action repetitively at the 8 KHz voice sampling rate.

The timing required to control and maintain synchronism among all MTSI circuits in the system is generated centrally at the System Controller.

Two types of MTSI circuits could be used. The first type allows independent assignments of Tx and Tx time slots to a line. This is referred to as a two-stage MTSI and requires two instructions from the processor to set up a two-way communication path.

Figure 6:
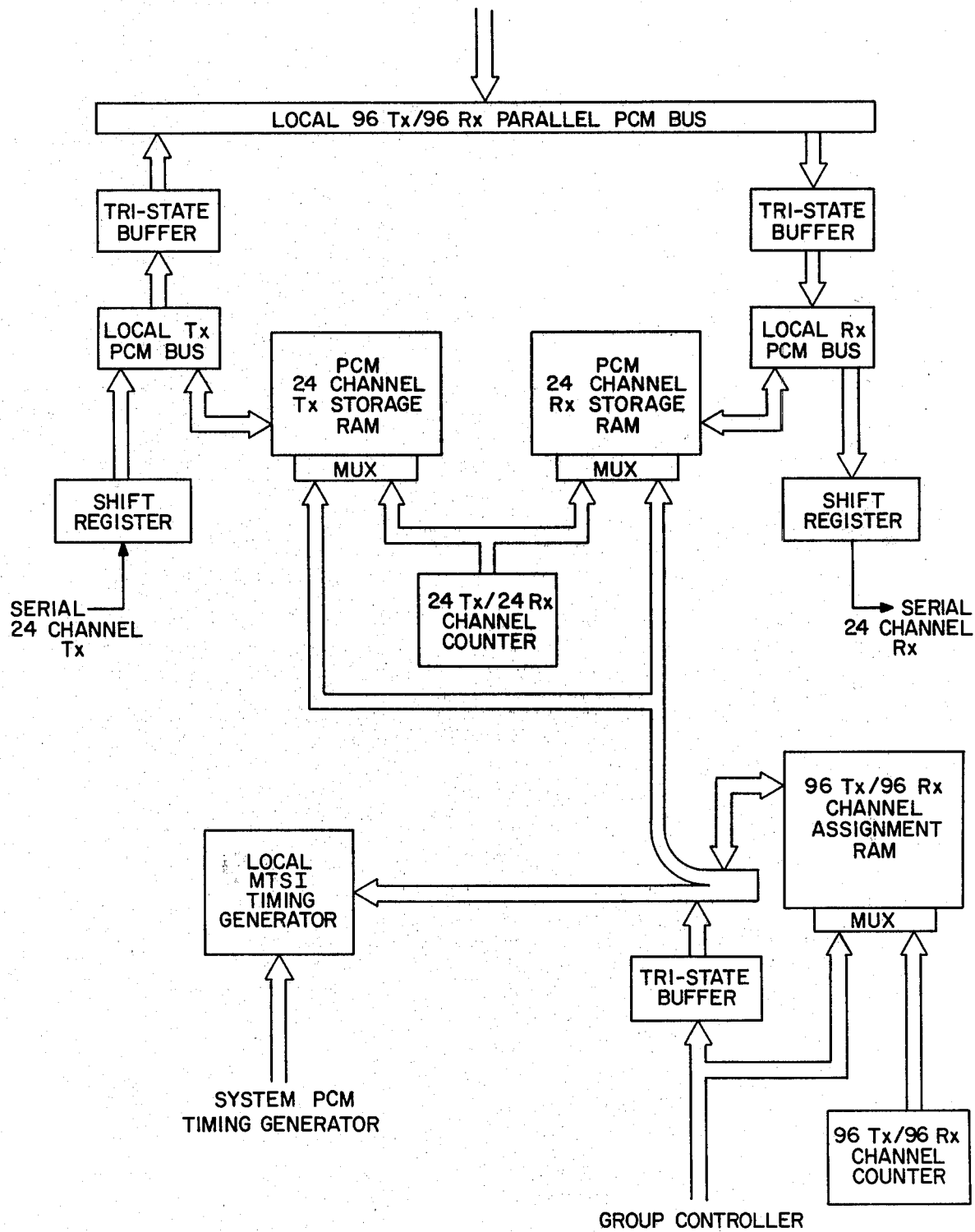
FIG. 6 is a schematic block diagram of a typical station to group time slot interchanging arrangement.

The MTSI, as shown in FIG. 6 is of the two-stage type, having a separate controller for the Tx and Fx functions. The Tx controller appears as a 256×5-bit RAM while the Rx controller appears as a 32×8-bit RAM to the processor. The processor controls the operation of the MTSI by writing certain bit patterns into these RAMs. The processor is also able to read the contents of these RAMs to verify data previously written. The MTSI also contains a Processor Interface Controller (PIC). The PIC interlaces the processor's READ/WRITE requests with the MTSI operation. This interface is transparent to both MTSI and the processor. The MTSI controllers have the highest priority for MTSI RAM access. Hence, the PIC forces wait cycles onto the processor until the MTSI controllers have completed their access.

The Tx controller appears as a 256×5-bit RAM of the 256 possible addresses, only addresses 0 to 191 are of prime importance. Addresses 0 to 191 refer to the 192 channel slots available on the system parallel PCM highway. The contents of each valid address (0 to 191) is a 5-bit binary number representing a serial Tx channel slot. For example, if address location 152 has the binary number 7 in RAM, then system Tx channel 152 has been assigned to serial Tx channel 7.

The system parallel PCM highway normally has many MTSI's connected to the highway. But only one MTSI Tx controller can be assigned to a given parallel channel slot. All other MTSI Tx controllers must have an unassigned code for that system parallel channel. If more than one MTSI Tx controller is assigned to the same system parallel channel, then a major bus clash will occur resulting in erroneous operation.

During system (or shelf) power-up, any one of the unassigned codes must be written into all 256 locations in the MTSI Tx controller RAM. Also, during a power-up sequence, the Tx controller's system bus drivers must be held in the TRI STATE mode until power-up has been achieved.

The MTSI Rx Controller appears as a 32×8-bit RAM. Only addresses 0 to 23 are of prime importance. The 24 Ram addresses (0 to 23) represent one of the 24 Rx serial channel numbers. The 8-bit contents of each address location represents one of the 192 (0 to 191) system parallel channels. Hence the address, together with the contents of that address, determine an Rx channel assignment. For example, if address 16 is assigned to system parallel channel 65, etc.

When writing into the Rx controller RAM, the complement of the actual data must be written. When reading from the Rx controllers may be assigned to the same parallel system PCM channel.

Summarizing, the present apparatus produces a system comprised of modules which are physically joined to produce the system. Each module is electrically coupled to the adjacent module over a first and a second multiple conductor cable to provide a system bus and a PCM bus.

What is claimed is:

1. A modular time division telecommunications system comprising a plurality of terminals separated into groups, a group controller for each group and a central controller common to all groups, each controller including a data processor, memory and associated control circuits, each said controller including a physically short, time division data bus structure for intercommunicating between a controller, its memory and associated control circuits, each group controller having a group bus for transmitting control data between that group and the terminals in its group, the central controller having system bus structure for communicating in time division from between the central controller and the group controllers, with said central controller housed in a first modular housing, and a plurality of group controllers housed in another modular housing, and the interconnection from said first housing to said other housing comprises a multiple conductor cable including said system bus structure.

2. A system as claimed in claim 1, in which there is a time division speech bus structure extending between the system controller housing and the other housing for the bidirectional transfer of speech data in time division form.

3. A system as claimed in claim 1, in which there is a common time division speech bus for the bidirectional exchange of speech data between said terminals under the control of said system controller, and in which there are time slot interchange means associated with each group controller for the interchange of speech data on said speech bus, and in which said speech bus comprises a multi-conductor cable extending between said housings.

4. A system as claimed in claim 1, in which said system can be expanded to include an additional group controller housed in a third modular housing, the interconnection of said third housing to the other housings being by means of a multiple conductor cable for data transmission and by a multiple conductor cable for speech data transmission.

* * * * *